(12) United States Patent
Chao et al.

(10) Patent No.: US 9,146,299 B2
(45) Date of Patent: Sep. 29, 2015

(54) METHOD AND APPARATUS FOR POSITION ESTIMATION USING TRAJECTORY

(71) Applicant: QUALCOMM Incorporated, San Diego, CA (US)

(72) Inventors: Hui Chao, San Jose, CA (US); Jiajian Chen, San Jose, CA (US); Sameera Poduri, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/960,595

(22) Filed: Aug. 6, 2013

(65) Prior Publication Data

US 2015/0045072 A1 Feb. 12, 2015

(51) Int. Cl.
*H04W 24/00* (2009.01)
*G01S 5/02* (2010.01)
*G01C 21/20* (2006.01)
*G01C 21/30* (2006.01)

(52) U.S. Cl.
CPC ............. *G01S 5/0294* (2013.01); *G01C 21/206* (2013.01); *G01C 21/30* (2013.01); *G01S 5/0278* (2013.01); *H04W 24/00* (2013.01)

(58) Field of Classification Search
USPC .................................... 455/456.1, 456.3, 457
See application file for complete search history.

(56) References Cited

U.S. PATENT DOCUMENTS

| | | | |
|---|---|---|---|
| 5,774,824 A | 6/1998 | Streit et al. | |
| 6,560,531 B1 | 5/2003 | Joshi | |
| 8,838,376 B2 | 9/2014 | Garin | |
| 2002/0038181 A1 | 3/2002 | Okude et al. | |
| 2011/0208429 A1 | 8/2011 | Zheng et al. | |
| 2011/0237275 A1 | 9/2011 | Hanada et al. | |
| 2012/0130632 A1 | 5/2012 | Bandyopadhyay et al. | |
| 2013/0017842 A1 | 1/2013 | Gupta et al. | |
| 2013/0257657 A1 | 10/2013 | Garin | |

FOREIGN PATENT DOCUMENTS

JP H06102052 A 4/1994

OTHER PUBLICATIONS

Co-pending U.S. Appl. No. 13/436,600, filed Mar. 30, 2012.
Eppstein, D., "Subgraph Isomorphism in Planar Graphs and Related Problems", Journal of Graph Algorithms and Applications, 1999, pp. 1-27, vol. 3, No. 3. http://www.cs.brown.edu/publications/jgaa/.
International Search Report and Written Opinion—PCT/US2014/046963—ISA/EPO—Oct. 28, 2014, 13 pgs.
Second Written Opinion from International Application No. PCT/US2014/046963, dated Jul. 17, 2015, 8 pp.

*Primary Examiner* — Sam Bhattacharya
(74) *Attorney, Agent, or Firm* — Hunter Clark PLLC

(57) ABSTRACT

Techniques for position estimation, e.g., of a mobile communication device, using trajectory are described herein. A method for estimating position of a mobile device described herein includes obtaining a routing graph corresponding to an area, wherein the routing graph indicates traversable paths through the area; collecting trajectory information corresponding to movement of the mobile device through the area; forming a trajectory graph from the trajectory information; comparing the trajectory graph to at least one subset of the routing graph to determine at least one matching subset of the routing graph; and estimating the position of the mobile device based at least in part on the at least one matching subset of the routing graph.

42 Claims, 12 Drawing Sheets

METHOD AND APPARATUS FOR POSITION ESTIMATION USING TRAJECTORY

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to obtain and utilized to locate the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others.

SUMMARY

A method for estimating position of a mobile device is described herein. The method includes obtaining a routing graph corresponding to an area, wherein the routing graph indicates traversable paths through the area; collecting trajectory information corresponding to movement of the mobile device through the area; forming a trajectory graph from the trajectory information; comparing the trajectory graph to at least one subset of the routing graph to determine at least one matching subset of the routing graph; and estimating the position of the mobile device based at least in part on the at least one matching subset of the routing graph.

A mobile device that facilitates position estimation is described herein. The mobile device includes a trajectory monitoring module configured to collect trajectory information corresponding to movement of the mobile device through an area; a trajectory graphing module communicatively coupled to the trajectory monitoring module and configured to forming a trajectory graph from the trajectory information; a graph matching module communicatively coupled to the trajectory graphing module and configured to obtain a routing graph corresponding to an area, wherein the routing graph indicates traversable paths through the area, and to compare the trajectory graph to at least one subset of the routing graph to determine at least one matching subset of the routing graph; and a position estimation module communicatively coupled to the graph matching module and configured to estimate the position of the mobile device based at least in part on the at least one matching subset of the routing graph.

Another mobile device that facilitates position estimation as described herein includes means for collecting trajectory information corresponding to movement of the mobile device through an area; means for forming a trajectory graph from the trajectory information; means for obtaining a routing graph corresponding to the area, wherein the routing graph indicates traversable paths through the area; means for comparing the trajectory graph to at least one subset of the routing graph to determine at least one matching subset of the routing graph; and means for estimating the position of the mobile device based at least in part on the at least one matching subset of the routing graph.

A processor-readable storage medium as described herein includes processor-executable instructions configured to cause a processor to collect trajectory information corresponding to movement of the mobile device through an area; generate a trajectory graph from the trajectory information; obtain obtaining a routing graph corresponding to the area, wherein the routing graph indicates traversable paths through the area; compare the trajectory graph to at least one subset of the routing graph to determine at least one matching subset of the routing graph; and estimate the position of the mobile device based at least in part on the at least one matching subset of the routing graph.

Another mobile device as described herein includes a memory configured to store data relating to a routing graph corresponding to an area, wherein the routing graph indicates traversable paths through the area; and a processor communicatively coupled to the memory and configured to collect trajectory information corresponding to movement of the mobile device through the area, to form a trajectory graph from the trajectory information, to compare the trajectory graph to at least one subset of the routing graph to determine at least one matching subset of the routing graph, and to estimate the position of the mobile device based at least in part on the at least one matching subset of the routing graph.

Items and/or techniques described herein may provide one or more of the following capabilities, as well as other capabilities not mentioned. Relationships between position and motion trajectory are leveraged to enhance positioning efficiency and accuracy. The position of a mobile device with respect to an area can be estimated based only on motion trajectory information and map data for the area, enabling positioning for devices lacking positioning capability or in areas in which satellite- or network-based positioning services are unavailable. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect.

DETAILED DESCRIPTION

Described herein are systems and methods for tracking a motion trajectory of a mobile device and using the tracked trajectory to estimate a position of the mobile device. While various embodiments are described herein in the context of an indoor positioning system, the systems and methods described herein can be extended more generally to any scenario in which a trajectory of a mobile device is monitored and the position of the mobile device is desirably estimated. In general, the device location may be inside or outside. In some embodiments, a position estimated via trajectory-based techniques as described herein can be used in combination with position estimates obtained based on a satellite positioning system, network measurements, or the like. A trajectory-based position estimate may be used in such embodiments in place of and/or to enhance position estimates obtained by other means, or vice versa.

Figure 1:
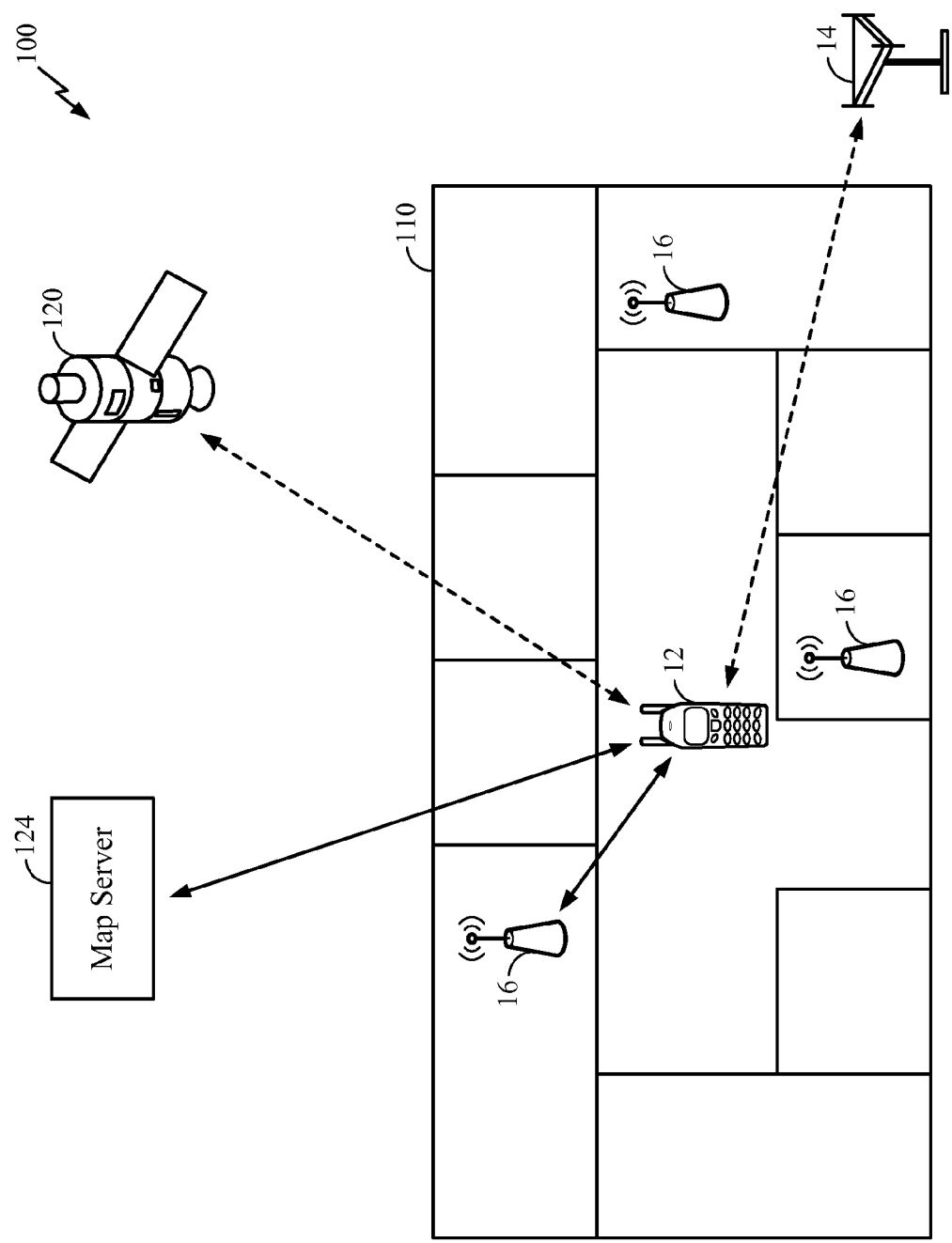
FIG. 1 is a schematic diagram of a wireless communication environment associated with an indoor region.

Systems and methods described herein operate via one or more mobile devices operating in a wireless communication system. Referring to FIG. 1, a wireless communication system 10 includes one or more base transceiver stations (BTSs), here one BTS 14, and wireless access points (APs) 16. The BTS 14 and APs 16 provide communication service for a variety of wireless communication devices, referred to herein as mobile devices 12. Wireless communication devices served by a BTS 14 and/or AP 16 can include, but are not limited to, personal digital assistants (PDAs), smartphones, computing devices such as laptops, desktops or tablet computers, automobile computing systems, etc., whether presently existing or developed in the future.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTS 14 and APs 16 can wirelessly communicate with the mobile devices 12 in the system 10 via antennas. A BTS 14 may also be referred to as a base station, a Node B, an evolved Node B (eNB), etc. The APs 16 may also be referred to as access nodes (ANs), hotspots, etc. The BTS 14 is configured to communicate with mobile devices 12 via multiple carriers. The BTS 14 can provide communication coverage for a respective geographic area, such as a cell. The cell of the BTS 14 can be partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

While both a BTS 14 and APs 16 are shown in the system 10, a wireless communication environment need not contain both BTSs 14 and APs 16, and may include BTSs 14, APs 16, or both in any number or configuration. Generally, a BTS 14 supports communication via one or more cellular radio access technologies such as Global System for Mobile Communication (GSM), Universal Mobile Telecommunications System (UMTS), Long Term Evolution (LTE) and/or other technologies developed by the Third Generation Partnership Project (3GPP), CDMA2000 and/or other technologies developed by 3GPP2, etc. An AP 16 generally supports communication via one or more technologies based on the IEEE (Institute of Electrical and Electronics Engineers) 802.11 specifications (e.g., Wi-Fi) or the like. However, BTSs 14 and APs 16 are not limited to these technologies and may employ additional or alternative functionality. Further, a single device may include some or all functionality of both a BTS 14 and an AP 16.

As further shown in system 10, the mobile device 12 is positioned within an venue (area, region) 110 such as a shopping mall, a school, or other indoor or outdoor area. Here, the APs 16 are positioned within the venue 110 and provide communication coverage for respective areas (rooms, stores, etc.) of the venue 110. Access to an AP 16 in the system 10 may be open, or alternatively access can be secured with a password, encryption key or other credentials.

The mobile devices 12 can be dispersed throughout the system 10. The mobile devices 12 may be referred to as terminals, access terminals (ATs), mobile stations, user equipment (UE), subscriber units, etc. The mobile devices 12 can include various devices as listed above and/or any other devices.

As further shown in FIG. 1, a mobile device 12 may receive navigation signals from a satellite positioning system (SPS), e.g., through SPS satellites 120. The SPS satellites 120 can be associated with a single multiple global navigation satellite system (GNSS) or multiple such systems. A GNSS associated with SPS satellites 120 can include, but are not limited to, Global Positioning System (GPS), Galileo, Glonass, Beidou (Compass), etc. SPS satellites 120 are also referred to as satellites, space vehicles (SVs), etc.

A mobile device 12 may be configured to obtain a partial or complete estimate of its current position within the system 10 using various techniques based on other communication entities within view and/or information available to the mobile device 12. For instance, a mobile device 12 can estimate its position using information obtained from APs 16 associated with one or more wireless local area networks (LANs), personal area networks (PANs) utilizing a networking technology such as Bluetooth or ZigBee, etc., SPS satellites 120, and/or map constraint data obtained from a map server 124.

Additionally or alternatively, techniques described herein enable the position of the mobile device 12 to be estimated based on the motion trajectory of the device 12. In general, the motion trajectory of the device 12, and by extension a user of the device 12, is obtained by tracking the relative motion of mobile device. Various technologies may be applied to track device motion. These include, but are not limited to, visual odometer implementations, inertial sensor-based approaches, or the like. With respect to a visual odometer, the trajectory of the device 12 is obtained by matching visual features within images captured within a predetermined time (e.g., still images captured at regular or irregular intervals, adjacent or periodic image frames in captured video, etc.) by a camera and/or other image sensor at the device 12. For a sensor-based odometer, the trajectory of the device 12 is obtained via measurements obtained by an accelerometer, gyroscope, magnetometer, or other orientation sensors. In some implementations, various mechanisms as generally known in the art may be applied to compensate for drifting and/or other factors that impact the accuracy of the orientation sensors. Other techniques are also possible, such as a combination of visual and sensor-based odometer approaches and/or any other trajectory tracking mechanisms either currently existing or existing in the future.

In some instances, the relationship between the trajectory and position of a given device 12 may not be clear. For instance, the motion trajectory of a device 12 is often obtained without knowledge of absolution position information. As a result, the absolute position of the device 12 may be unknown even in cases where the trajectory of the device 12 is known. The techniques described herein clarify the relationship between motion trajectory and absolute position using map data and/or other supplemental data, thereby enabling user position to be estimated from a motion trajectory.

Figure 2:
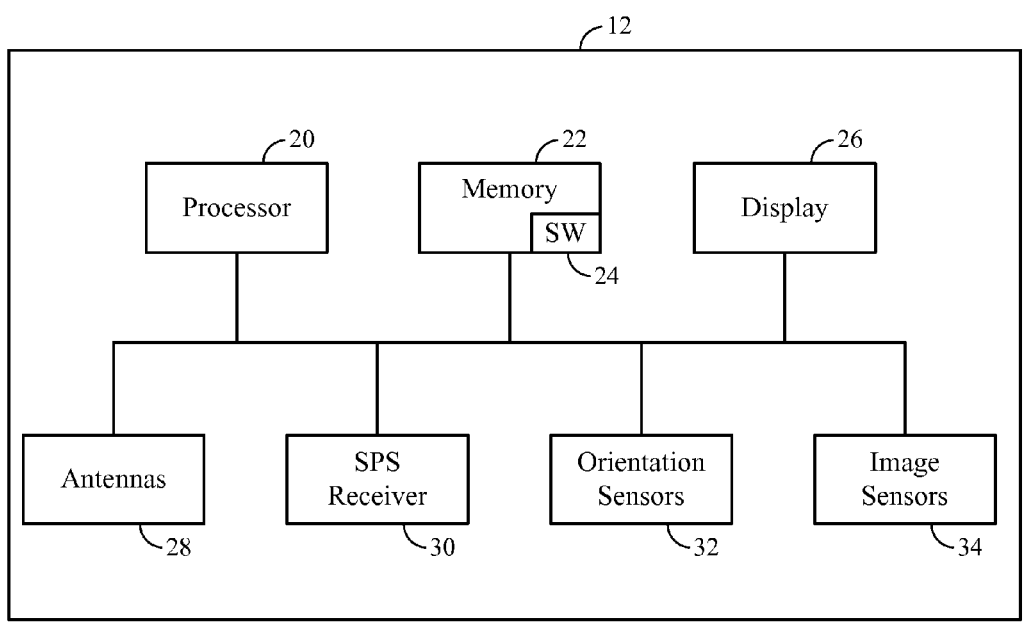
FIG. 2 is a block diagram of components of one embodiment of a mobile station shown in FIG. 1.

Referring next to FIG. 2, the mobile device 12 comprises a computer system including a processor 20, memory 22 including software 24, a display 26, antennas 28, a SPS receiver 30, orientations sensors 32, and image sensors 34. The antennas 28 provide bi-directional communication functionality to other entities in one or more associated wireless communication networks, e.g., a BTS 14 associated with a cellular network, APs 16 associated with a localized communication network, etc., as shown in FIG. 1. The antennas 28 may operate independently of, or with the assistance of, a receiver, transmitter or transceiver (not shown). In some implementations, different ones of the antennas 28 may be used for different communication systems. Here, the antennas 28 include an antenna for communicating with the BTS 14 and an antenna for communicating with the APs 19. In other implementations, antennas 28 used for communication with a given communication system may optionally be further divided into transmit (Tx) antennas and receive (Rx) antennas. Alternatively, respective ones of the antennas 28 can be used for both transmission and reception for an assigned system or combination of systems. The device 12 shown in FIG. 2 also includes a SPS receiver 30 for receiving SPS signals via one or more associated SPS antennas (not shown), although as described herein, a device 12 can be operable to perform the techniques described herein with either no SPS receiver 30 or a SPS receiver with limited functionality.

The processor 20 is preferably an intelligent hardware device, e.g., a central processing unit (CPU) such as those made by ARM®, Intel® Corporation, or AMD®, a microcontroller, an application specific integrated circuit (ASIC), etc. The processor 20 could comprise multiple separate physical entities that can be distributed in the mobile device 12. The memory 22 includes random access memory (RAM) and read-only memory (ROM). The memory 22 is a non-transitory processor-readable storage medium that stores software 24 which is processor-readable, processor-executable software code containing processor-readable instructions that are configured to, when executed, cause the processor 20 to perform various functions described herein (although the description may refer only to the processor 20 performing the functions). Alternatively, the software 24 may not be directly executable by the processor 20 but configured to cause the processor 20, e.g., when compiled and executed, to perform the functions. Media that can make up the memory 22 include, but are not limited to, RAM, ROM, FLASH, disc drives, etc.

The display 26 comprises means and/or mechanisms for rendering information for viewing by a user of the device 12. The display 26 may include a physical surface, such as a screen, on which information is shown, and/or a projector or other means for projecting information onto a surface not associated with the device 12. The display 12 may be physically integrated into the device 12 or may be external to and communicatively coupled to the device 12, e.g., in the case of a display monitor or the like. Further, the display 26 may be a touchscreen and/or otherwise integrated with input functionality and/or other functions of the device 12.

The orientation sensors 32 conduct measurements relating to the relative orientation of the device 12 with respect to a given reference orientation and convey this information to the processor 20 and/or other elements of the device 12 for further processing. The orientation sensors 32 may include, but are not limited to, a linear accelerometer, a gyroscope, a magnetometer (compass), etc. In general, a linear accelerometer measures linear acceleration in relation to gravity, a gyroscope measures angular/rotational acceleration, and a magnetometer measures heading of the device 12 relative to magnetic north. Linear accelerometers and/or gyroscopes may be multi-axis accelerometers configured to measure acceleration along multiple axes (e.g., x-y-z or north-east-down axes with respect to the Earth for a linear accelerometer, roll-pitch-yaw axes with respect to a gyroscope, etc.), or alternatively one or more single-axis accelerometers may be used. Further, measurements made by a magnetometer may be adjusted (e.g., by the magnetometer itself and/or by an associated processor 20) by magnetic declination and/or other correction factors to account for a difference between magnetic north and true north.

The image sensors 34 include cameras and/or other devices for capturing and processing images of an area in view of the device 12. Generally, a camera includes an optical system including one or more lenses, which collectively define a field of view of the camera from which images are captured. Lenses and/or other components of the optical system can be housed within the device 12 or can be external to the device 12, e.g., as lens attachments or the like. The optical system is communicatively coupled with an image capture unit, which includes complementary metal-oxide-semiconductor (CMOS), a charge-coupled device (CCD) and/or other technology to convert optical images into electrical information that is transferred to one or more processing entities of the device 12, such as the processor 20. The image sensors 34 may include one camera or multiple cameras, such as a front-facing camera disposed along a front side of the device 12 and a back-facing camera disposed along a back side of the device 12. If multiple cameras are present at the device 12, the cameras can operate interdependently or independently of one another.

The orientation sensors 32 and/or image sensors 34 can communicate with the processor 20 and/or memory 22 to generate or otherwise obtain metadata associated with sensor measurements, captured images or video, or the like. Metadata associated with, or linked to, an image contains information regarding various characteristics of the image. For instance, metadata includes a time, date and/or location at which an image is captured, image dimensions or resolution, an identity of the camera and/or mobile device 12 used to capture the image, etc. Metadata utilized by a camera are generated and/or stored in a suitable format, such as exchangeable image file format (EXIF) tags or the like. The orientation sensors 32 and/or image sensors 34 can also utilize the antennas 28 to facilitate transmission of information obtained by the sensors 32, 34 to one or more other entities within an associated communication network.

Here, the orientation sensors 32 and/or image sensors 34 are utilized to obtain data relating to the motion trajectory of the device 12, which is subsequently utilized as described herein to estimate the position of the mobile device (e.g., with respect to an area or region). For instance, the orientation sensors 32 may be utilized to implement a sensor-based odometer as described above, and the image sensors 34 may be utilized to implement a visual odometer as described above. Other implementations are also possible, as will be described herein.

Figure 3:
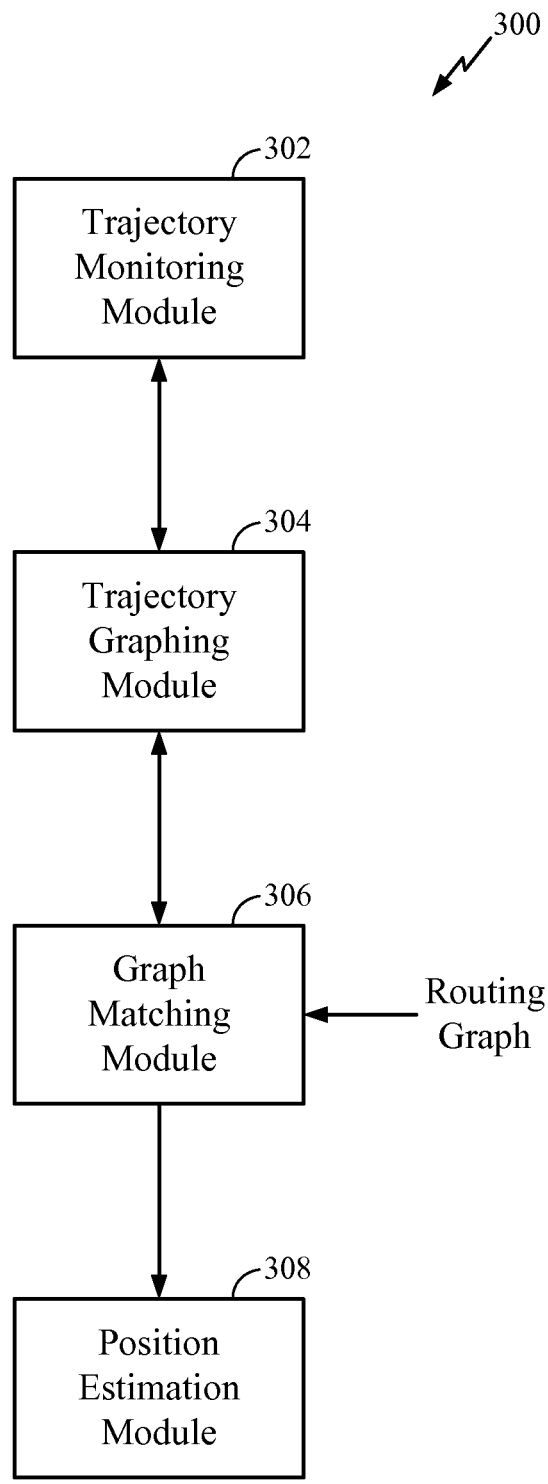
FIG. 3 is a block diagram of a system for estimating position of a mobile device based on a trajectory of the device.

Referring next to FIG. 3, a system 300 for estimating position of a mobile device 12 based on a trajectory of the device 12 includes a trajectory monitoring module 302, a trajectory graphing module 304, a graph matching module 306, and a position estimation module 308. The trajectory monitoring module 302 collects trajectory information corresponding to movement of the device 12 through an area. This trajectory information is provided to the trajectory graphing module 304, which forms a trajectory graph from the trajectory information. The trajectory graph is compared to a routing graph corresponding to the area in which the device 12 is located by a graph matching module 306. By utilizing techniques described herein, the graph matching module 308 matches the trajectory graph produced by the trajectory graphing module 304 to at least one subset of the routing graph. This matching subset is then utilized by the position estimation module 308 to estimate the position of the mobile device 12. As a result of the processing performed by the position estimation module 308, the past trajectory of the mobile device 12 and its user and the current location of the device 12 and user are identified with respect to a map of the area in which the device 12 is located.

Figure 4:
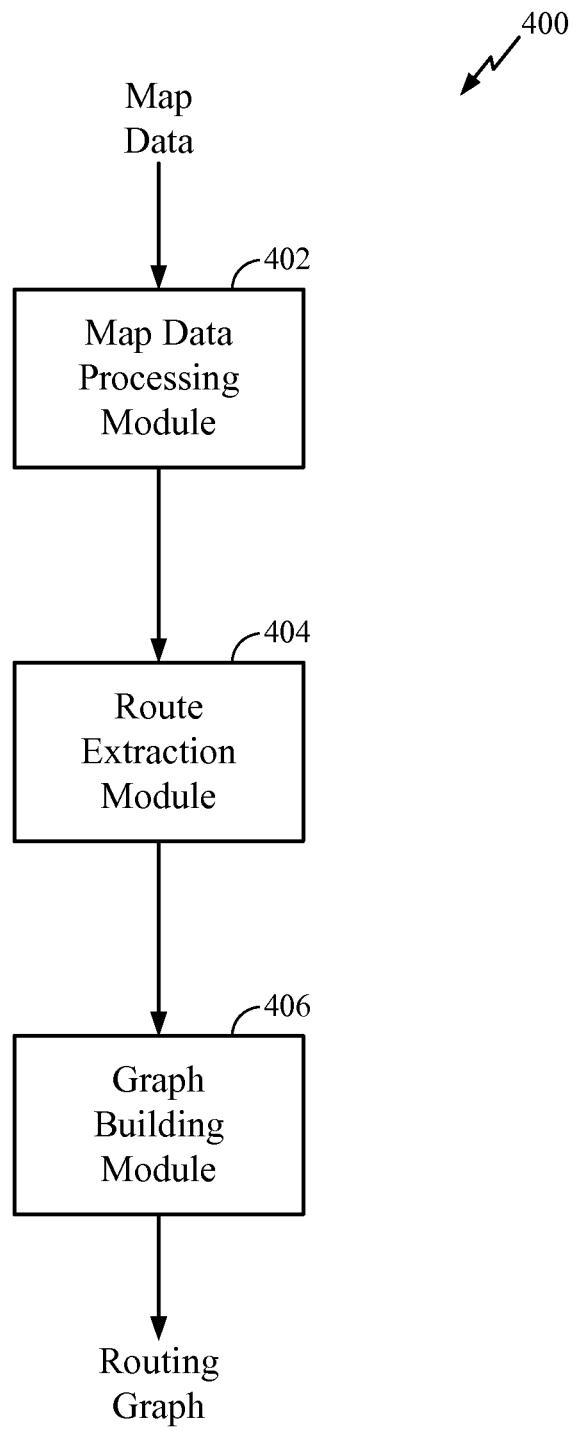
FIG. 4 is a block diagram of a system for building a routing graph from map data representative of an area.

Prior to operation of the system 300 shown in FIG. 3, a routing graph corresponding to an area or region is constructed based on map data for the area. A system 400 for construction of a routing graph is shown in FIG. 4. The system 400 includes a map data processing module 402, a route extraction module 404, and a graph building module 406. The modules 402, 404, 406 may be implemented by a device that also implements the system 300, e.g., a mobile device 12. Alternatively, the system 400 may be implemented at a server or other computing entity communicatively coupled to the mobile device 12, and routing information produced by the system 400 may be communicated to the mobile device 12 periodically and/or as needed by the mobile device 12. In still other embodiments, the system 400 may generate routing information for an area or collection of areas to be subsequently transferred to a memory 22 of the mobile device 12, e.g., at an initial configuration of the mobile device 12, installation of a positioning application associated with the routing information, etc. Transfer of routing information from a system 400 external to the mobile device 12 to a memory 22 of the mobile device 12 may occur directly, e.g., via direct wired or wireless communication between the system 400 and the device 12 or a computer storage medium on which the routing information is stored, or indirectly, e.g., by first transferring the routing information from the system to an intermediary computing device and subsequently synchronizing and/or otherwise transferring the information from the intermediary computing device to the mobile device 12.

The map data processing module 402 receives map data corresponding to an area, which may be in the form of computer files such as structural files (e.g., computer-aided drafting (CAD) files or the like), image files (e.g., vector images or raster images), etc. Map data may additionally or alternatively be provided as or supplemented by a non-graphical representation of properties of an area (e.g., given as Extensible Markup Language (XML) files or the like), and/or by other means. Other map data formats are also possible. The map data processing module 402 performs initial processing operations such as format conversion, image processing and/or normalization, etc., in order to enable further processing of the map data by the route extraction module 404. In some implementations, the map data processing module 402 may be omitted from the system 400, and the map data may instead be provided directly to the route extraction module 404.

The map data processing module 404 utilizes one or more techniques to obtain a skeleton of open space (e.g., rooms, hallways, etc.) associated with the area depicted by the map data. This skeleton is, in turn, utilized by the graph building module 406 to construct a routing graph representative of traversable paths through the area corresponding to the map data.

Figure 5:
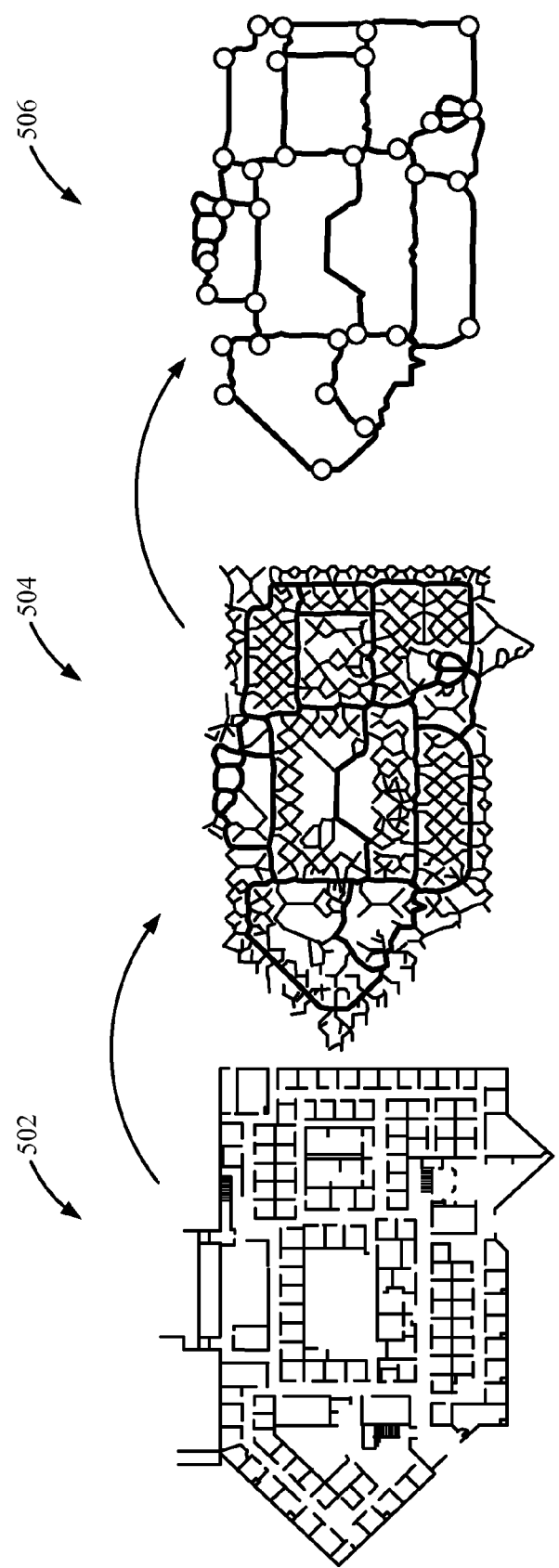
FIG. 5 is an illustrative view of graph building functions performed by the system shown in FIG. 4.

FIG. 5 illustrates a technique by which map data provided in the form of a map image is processed by the route extraction module 404 and the graph building module 406. Diagram 502 in FIG. 5 is an image corresponding to a map of an area for which positioning is desirably performed. The map image may be processed as described above via the map data processing module 402, although this processing may be omitted in some implementations. Further, the map image may be of any format usable by the system 400. Such formats may include, but are not limited to, rasterized image formats such as bitmap image formats, Graphics Interchange Format (GIF), Portable Network Graphics (PNG), JPEG, etc., vectorized image formats such as Scalable Vector Graphics (SVG) or the like, etc.

Here, the route extraction module 404 utilizes image morphology to extract the traversable routes depicted on the map image. Morphology is a broad set of image processing operations that process images based on shapes. Morphological operations apply a structuring element to an input image, creating an output image of the same size. In a morphological operation, the value of each pixel in the output image is based on a comparison of the corresponding pixel in the input image with its neighbors.

The morphological operations utilized by the route extraction module 404 with respect to the map image begin with an image dilation to correct broken lines and/or cracks in the original image. In general, image dilation adds pixels to the boundaries of objects in an image. This is in contrast to erosion, which removes pixels on object boundaries. The number of pixels added or removed from the objects in an image depends on the size and shape of the structuring element used to process the image. In the morphological dilation and erosion operations, the state of any given pixel in the output image is determined by applying a rule to the corresponding pixel and its neighbors in the input image. The rule used to process the pixels defines the operation as dilation or erosion.

Following the dilation, a classification is performed on the map image to distinguish areas inside the region depicted by the map from areas outside the region. Next, a morphological erosion is performed on the image such that closely located structures, such as parallel walls depicted in the image as black lines and having an associated value of 0, are combined. More particularly, erosion causes the value of an output pixel to be the minimum value of all the pixels in the input pixel's neighborhood. Thus, in a binary (e.g., black and white) image, if any of the pixels is set to 0, the output pixel is set to 0.

Following the erosion, a morphological skeletonization is used to obtain all possible paths depicted in the map image. Skeletonization removes pixels on the boundaries of objects but does not allow objects to break apart. The pixels remaining make up the image skeleton. Finally, a morphological shrink is performed on the skeletonized image to obtain all major paths. Here, a "major path" is defined as a path that forms a loop in the map image. Major paths are typically major hallways that do not lead to a dead end or an exit, although other major paths could also be present and identified. Shrinking reduces objects to points and removes pixels such that objects without holes shrink to a point and objects with holes shrink to a connected ring halfway between each hole and the outer boundary. The result of the skeletonization and shrinking is shown in diagram 504, where the lines represent the paths found through skeletonization and the heavy lines represent major paths identified via shrinking.

While the above description relates to operation of the route extraction module 404 via image morphology, any technique by which the route extraction module 404 obtains routing information for an area of interest could be utilized. Unless explicitly stated otherwise, the implementations described herein are not intended to be limited to this or any other technique for identifying or utilizing traversable paths through an area.

Upon identification of traversable routes or paths through the area of interest via the route extraction module 404, the graph building module 406 utilizes the identified routes to build a routing graph corresponding to the area. An example of a routing graph built by the graph building module 406 is shown by diagram 506 in FIG. 5. Here, the graph building module 406 constructs the routing graph for the area based on the major paths identified by the route extraction module 404, and the other paths identified by the route extraction module 404 are discarded. Alternatively, however, the graph building module 406 could use some or all of the non-major paths, and/or any other pathing information associated with the area.

Upon receiving routing information from the route extraction module 404, the graph building module 406 assigns graph nodes to various points along the identified routes. Here, the nodes are identified as either points that connect two line segments in the routing information at an angle of (90±α) degrees for some angle constant α or branch points that connect three or more line segments of at least a threshold length (e.g., 10 feet, etc.). The parameter α is chosen to manage the number of nodes in the graph in view of a tradeoff between the simplicity and robustness of the routing graph. In one implementation, α is chosen to be approximately 20 degrees. Other implementations are possible.

Figure 6:
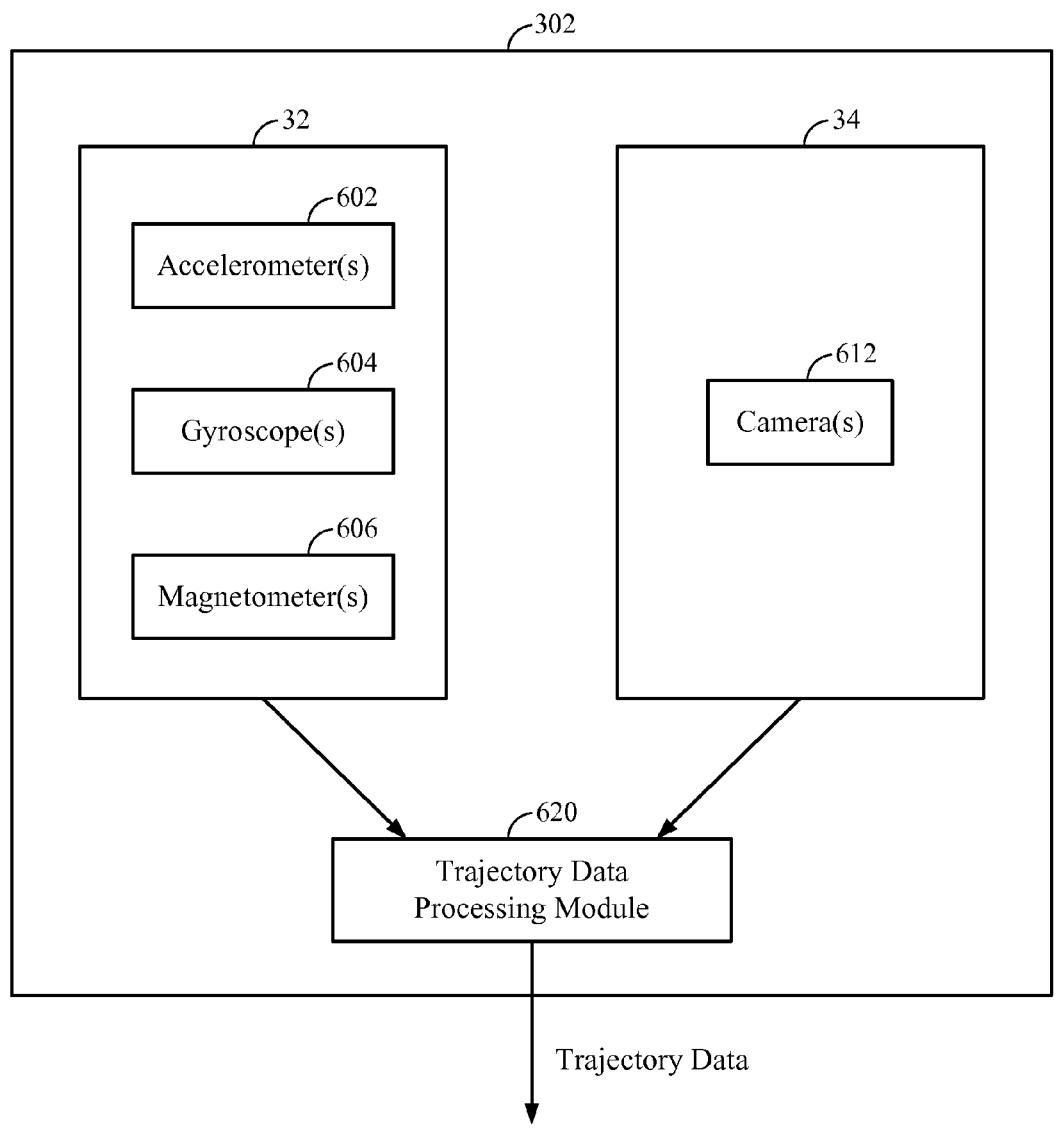
FIG. 6 is a block diagram of components of one embodiment of the trajectory monitoring module shown in FIG. 3.

In sum, the result of the system 400 is a routing graph for a given area that contains nodes corresponding to points of interest (e.g., intersections, etc.) within the area and edges representing paths connecting the nodes. To estimate the position of a user within the area, trajectory information corresponding to the user is tracked and compared to the routing graph for the area. Referring next to FIG. 6, an implementation of the trajectory monitoring module 302 is shown in further detail. The trajectory monitoring module 302 includes one or more orientation sensors 32, such as an accelerometer 602, gyroscope 604, or magnetometer 606, and/or one or more image sensors 34 such as cameras 612 or the like, as described above with respect to FIG. 2. While both orientation sensors 32 and image sensors 34 are shown in FIG. 6, some implementations of the trajectory monitoring module 302 may include only one set of sensors 32, 34. Further, the orientation sensors may include any number or configuration of sensors 602, 604, 606, and the image sensors may include any number or configuration of cameras 612 and/or other sensors.

Raw data collected by the sensors 32, 34 are processed by a trajectory data processing module 620 for subsequent communication to the trajectory graphing module 304. The trajectory data processing module 620 is implemented via the processor 20 and/or by any other appropriate means associated with a mobile device 12. Alternatively, the trajectory data processing module 620 may be associated with a computing device that is different from a device associated with the sensors 32, 34. For instance, sensor measurements may be transmitted to a server implementing the trajectory data processing module 620, and the processed data and/or data obtained via the processed data may be sent back to the device associated with the sensors 32, 34 as needed. Other implementations are also possible.

The trajectory data processing module 620 utilizes the measurements provided by the sensors 32, 34 to obtain a trajectory of the sensors 32, 34 over time. As used herein, the term "trajectory" as applied to a user and/or a device refers to a plotted history of locations of the user and/or device associated with movement of the user and/or device over a monitored time period. The trajectory data processing module 620 obtains this location history using techniques such as the visual odometer, sensor-based odometer, or a combination of visual and sensor-based techniques (e.g., visual-inertial odometry) as described above. For instance, for visual odometer processing, the trajectory data processing module 620 receives images captured by one or more image sensors 34 and identifies one or more objects and/or other features in the images. The relative positions of these image features in images captured at different points in time are used to infer movement of the image sensor 34, from which trajectory can be computed. For sensor-based odometer processing, the trajectory data processing module 620 receives orientation measurements (e.g., acceleration measurements from accelerometers 602 or gyroscopes 604, magnetic measurements from magnetometer 606, etc.) collected over a period of time and computes the relative motion of the device based on observed changes in the orientation measurements. In visual-inertial odometry, both image features and sensor data are used to find an optimal solution in estimating the relative motion between two points.

Figure 7:
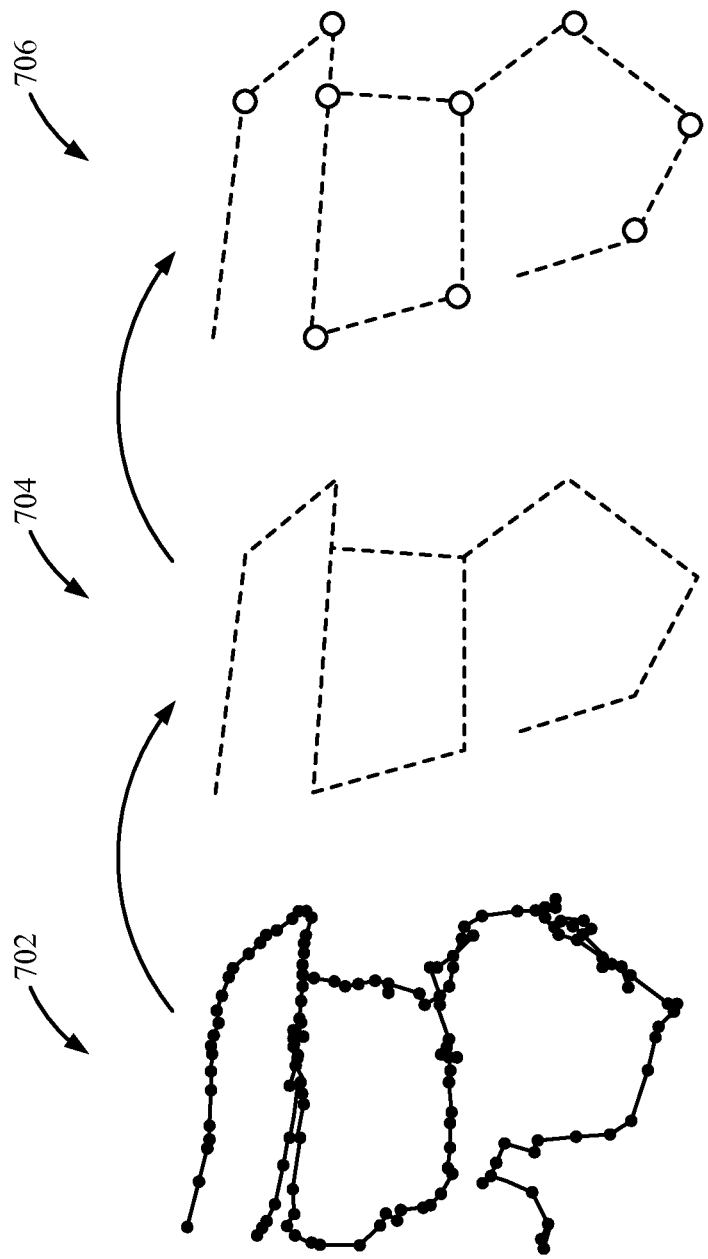
FIG. 7 is an illustrative view of graph building functions performed by the trajectory graphing module shown in FIG. 3.

As a result of the processing performed by the trajectory monitoring module 302, a graphical estimate of the trajectory of the device 12 is obtained, as shown by diagram 702 in FIG. 7. This estimate is processed by the trajectory graphing module 304 to form a trajectory graph. Processing by the trajectory graphing module 304 begins by smoothing the trajectory data provided by the trajectory monitoring module 302 using a sliding window and/or other smoothing techniques. Diagram 704 illustrates a result of smoothing as performed on the initial trajectory data shown in diagram 702. Next, turns in the smoothed trajectory are identified and classified as potential nodes in the trajectory graph. Similar to node identification on the routing graph as described above, nodes on the trajectory can be identified by the trajectory graphing module 704 as points connecting two major line segments at an angle between (90±α) degrees. Here, the parameter α is chosen using similar criteria to that for construction of the routing graph, although different criteria could also be used. Based on the defined nodes, edges in the trajectory graph are defined as straight-line paths connecting nodes in the graph. Diagram 706 illustrates a trajectory graph constructed from the trajectory information shown in diagram 702.

Figure 8:
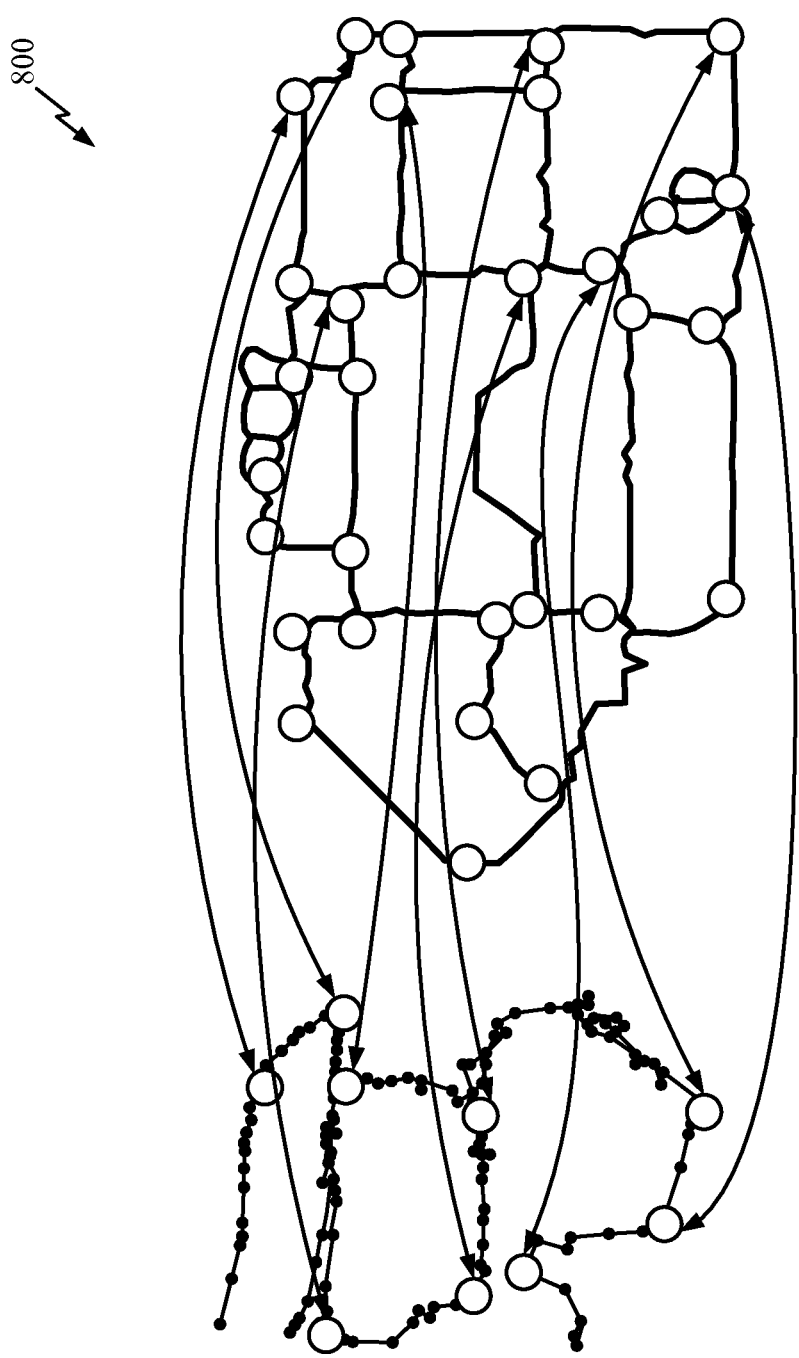
FIG. 8 is an illustrative view of matching functions performed by the graph matching module shown in FIG. 3.

Once a routing graph has been constructed for an area, a motion trajectory of a device 12 within the area is identified and a trajectory graph is constructed from the device trajectory, the graph matching module 306 attempts to match the trajectory graph with some subset of the routing graph. An example of the matching performed by the graph matching module 306 is shown by diagram 800 in FIG. 8.

The graph matching module 306 compares the trajectory graph to the routing graph in order to identify at least one subset of the routing graph that exhibits at least a threshold degree of similarity with the trajectory graph. Here, comparison between the trajectory and routing graphs is performed as a variant of the maximum common edge subgraph problem. The matching between the trajectory and routing graphs may be based on node or edge criteria such as the length of the edges between nodes, the number, distance and/or orientation of neighboring nodes, the orientation of edges (if such data is available), etc. In some implementations, a depth-first search starting from each vertex in the routing graph could be used to find a match between the routing graph and the trajectory graph, e.g., by finding a global solution having a highest overall score of all potential matches. Other techniques for comparing the graphs could also be used. For instance, as both the routing graph and the trajectory graph are planar, one or more polynomial time algorithms could be used by the graph matching module 306. Other algorithms are also possible.

The graph matching module 306 may additionally perform one or more adaptive measures if a unique match between the trajectory graph and a subset of the routing graph is not initially found. For instance, if a comparison of the trajectory and routing graphs results in no matches with a sufficient degree of confidence, the graph matching module 306 may repeat the matching for respective subsets of the trajectory graph by omitting one or more nodes from each subset. If a match of sufficient confidence is found between the trajectory graph and a subset of the routing graph after omitting one or more nodes from the trajectory graph, the omitted nodes may be classified as false nodes and dropped. The graph matching module 306 may also utilize one or more techniques for outlier detection in order to classify nodes in the trajectory graph as false nodes either prior to or during the initial matching operations.

Figure 9:
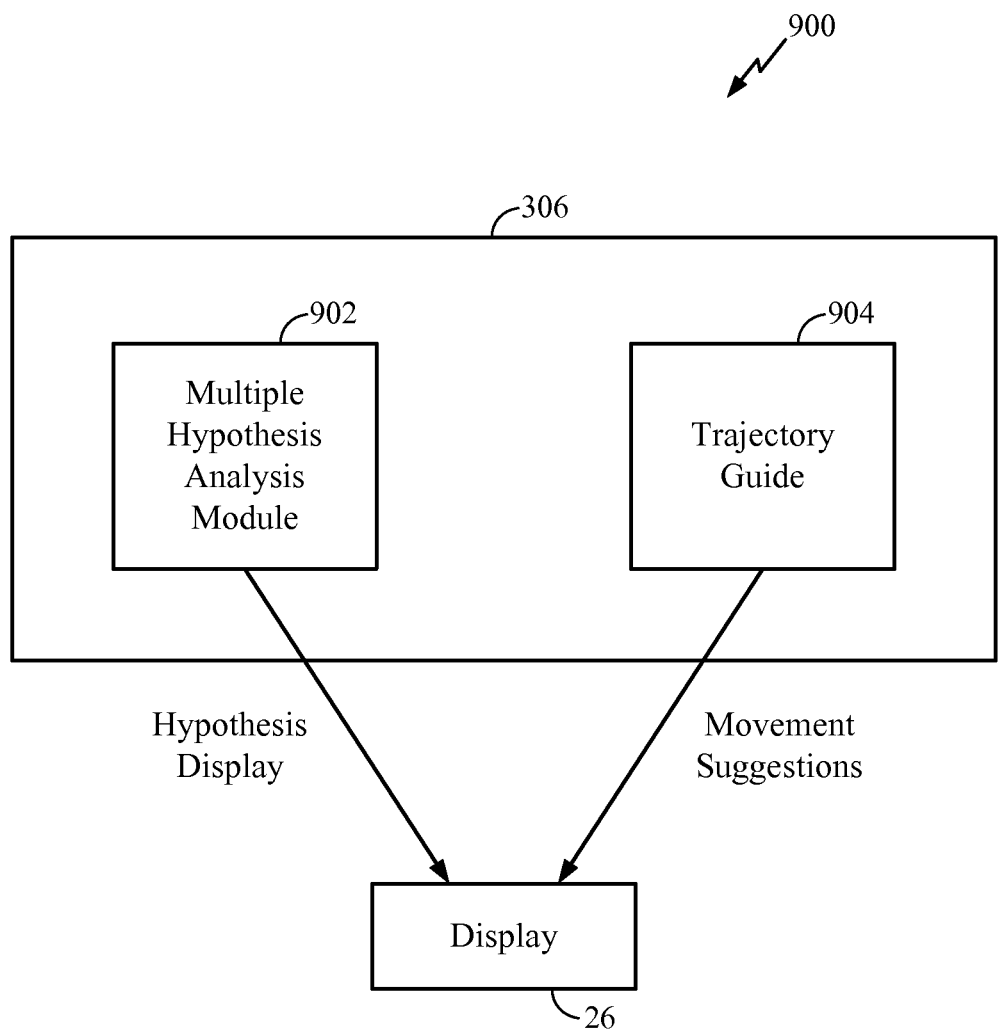
FIG. 9 is a block diagram of a system for estimating position of a mobile device using multiple-hypothesis tracking.

As another adaptive measure, the graph matching module 306 may employ multiple-hypothesis tracking if an initial comparison between the trajectory graph and the routing graph results in multiple matching subsets of the routing graph. This may occur when, for example, multiple portions of a building or other associated area have similar shapes and/or sizes. FIG. 9 illustrates a system 900 that can be utilized by the graph matching module 306 for resolving multiple matching hypotheses. Here, the graph matching module 306 utilizes a multiple hypothesis analysis module 902 to simultaneously track multiple routing hypotheses in the manner described above for a single hypothesis. The multiple hypothesis analysis module 902 additionally provides graphical information relating to of the multiple routing hypotheses to a display 26 at an associated device 12 for viewing by a user. As the user of the device 12 moves, new odometry information is available. The multiple hypothesis analysis module 902 utilizes this additional information to eliminate some hypotheses (if possible) such that fewer hypotheses are left on the display 26.

In addition, the graph matching module 306 can utilize a trajectory guide 904 in combination with the multiple hypothesis analysis module 902 to guide the user either explicitly or implicitly to take turns and/or move in other prescribed ways, thereby generating additional nodes on the trajectory map to aid in the computation of a unique mapping between the trajectory and routing graphs. In the case of explicit guide information, the trajectory guide 904 provides movement suggestions to the display 26 for viewing in combination with the multiple hypotheses. An example of such a display is shown by diagram 1000 in FIG. 10, in which a set of two positioning hypotheses 1002, 1004 and an explicit guiding instruction, here a left turn instruction 1006, are displayed to a user. As the user moves through the area, previously obtained routing estimates determined to be unlikely based on new trajectory data are eliminated from consideration by the graph matching module 306 and illustration at the display 26.

Figure 10:
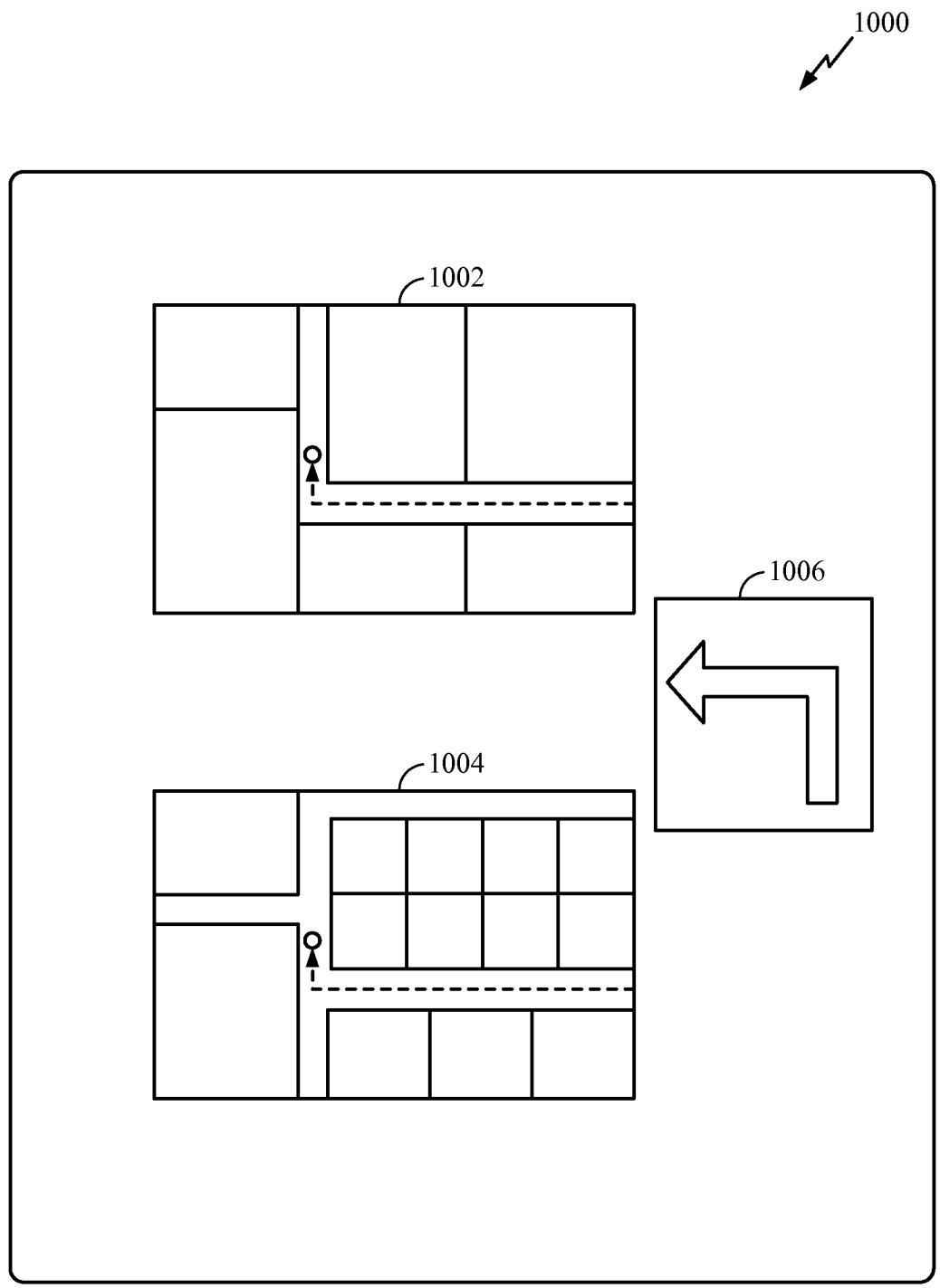
FIG. 10 is an illustrative view of a display that may be used in conjunction with the multiple-hypothesis tracking system shown in FIG. 9.

Other display configurations and/or displayed information to that shown in FIG. 10 could also be utilized. Further, as an alternative to explicit guide directions, guiding by the graph matching module 306 may be implicit based on the display of the positioning hypotheses, e.g., hypotheses 1002, 1004. Further, while the trajectory guide 904 is illustrated as a separate module from the multiple hypothesis analysis module 902 in FIG. 9, the functionality of the trajectory guide 904 may be combined with that of the multiple hypothesis analysis module 902, or the trajectory guide may be omitted (e.g., in the case of implicit guiding), in some implementations.

Returning to FIG. 3, once a unique matching between the trajectory graph and a subset of the routing graph is obtained by the graph matching module 306, the position estimation module 308 estimates the location of the mobile device 12 based on the matching result. The location obtained by the location estimation module 308 may be a relative location, e.g., a location relative to the area and/or a coordinate system defined with respect to the area, or an absolute location. To determine a relative location of the device 12 within the area, the position estimation module 308 identifies the past trajectory of the device 12 relative to the area based on the matching performed by the graph matching module 306 and the map data, obtains a most recent point corresponding to the trajectory, and relates the most recent trajectory point to a location represented by the map data. Additionally, the position estimation module 308 may determine an absolute location of the device 12 by supplementing the relative location with respect to the area with location information corresponding to the area, such as latitude/longitude coordinates and/or an address of the area, or other information sufficient to enable the position estimation module 308 to relate the relative position of the device 12 with respect to the area to an absolute location, e.g., with respect to the Earth. Upon determining the relative and/or absolute location of the device 12, the determined location may also be displayed (e.g., on a display 26) and/or used for other operations at the device 12. In some implementations, the position estimation module may supplement a trajectory-based position estimate with one or more position estimates obtained via network measurements (e.g., based on signals received at antennas 28), SPS measurements (e.g., based on signals received via an SPS receiver 30), or the like.

Figure 11:
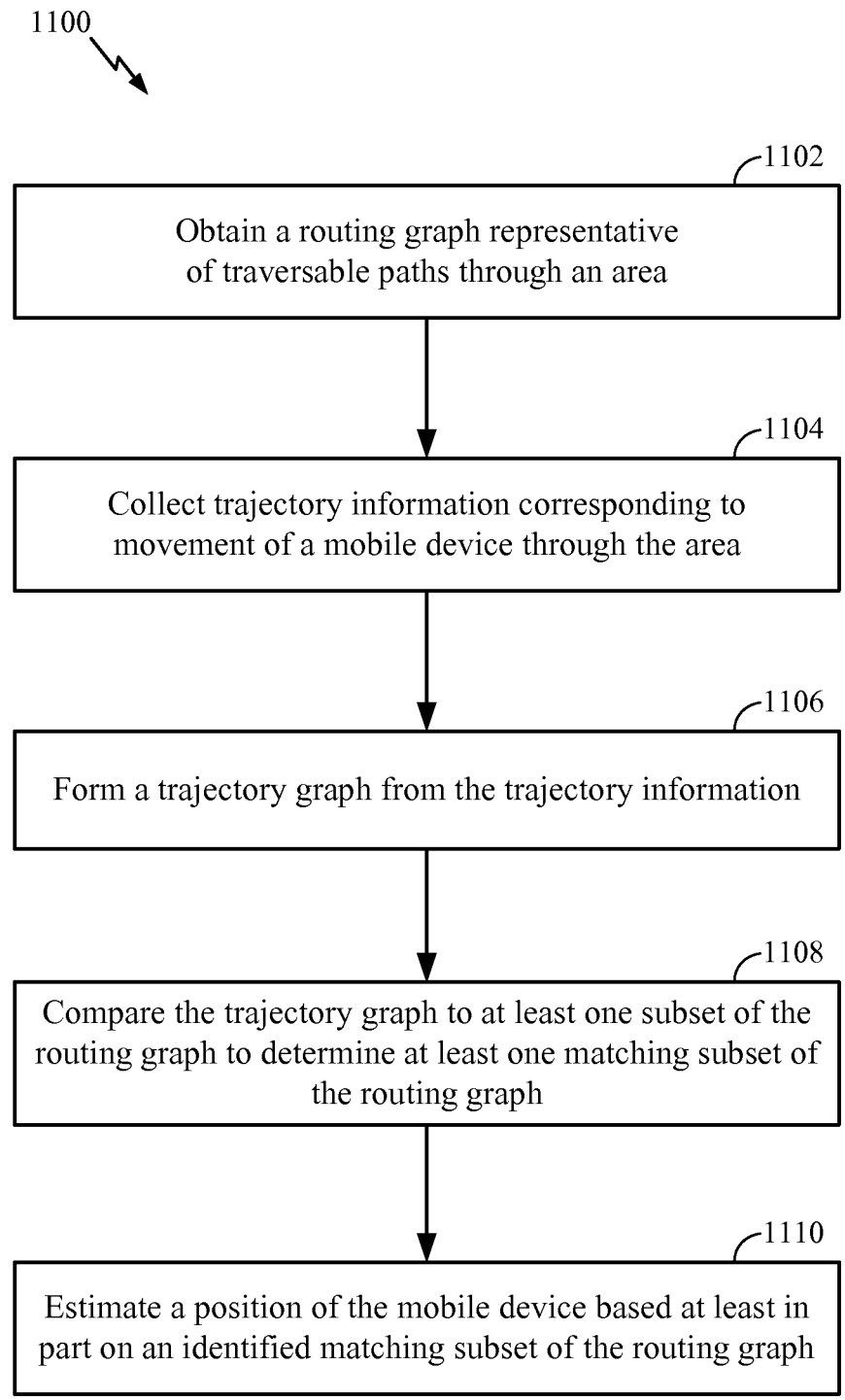
FIGS. 11-12 are block flow diagrams of respective processes of estimating position of a mobile device using trajectory information.

Referring to FIG. 11, with further reference to FIGS. 1-10, a process 1100 of estimating position of a mobile device 12 using trajectory information includes the stages shown. The process 1100 is, however, an example only and not limiting. The process 1100 can be altered, e.g., by having stages added, removed, rearranged, combined, and/or performed concurrently. Still other alterations to the process 1100 as shown and described are possible.

At stage 1102, a routing graph representative of traversable paths through an area (e.g., a building or other region) is obtained. Here, the routing graph is constructed as described above with respect to system 400. The routing graph may be constructed and obtained at the time the remaining stages 1104, 1106, 1108, 1110 of process 1100 are performed. Alternatively, the routing graph may be obtained in advance at stage 1102 and stored until needed.

At stage 1104, trajectory information corresponding to movement of a mobile device 12 through the area is collected, e.g., by a trajectory monitoring module 302. The trajectory information can be collected using any suitable techniques based on measurements and/or information from any sensors capable of providing trajectory information. For instance, vision-based or orientation sensor-based trajectory tracking techniques such as those described above, and/or any other techniques, could be used.

At stage 1106, a trajectory graph is formed, e.g., by a trajectory graphing module 304, from the trajectory information obtained at stage 1104. As described above with respect to FIG. 7, the trajectory graph is formed at stage 1106 by identifying turns of an angle within a threshold range (e.g., 90±α degrees for a given parameter α) that are indicated by the trajectory information, defining the identified turns as nodes in the trajectory graph, and defining straight-line segments or other representations of movement between the identified turns as edges in the trajectory graph.

At stage 1108, the trajectory graph formed at stage 1106 is compared, e.g., by the graph matching module 306, to at least one subset of the routing graph obtained at stage 1102 in order to determine at least one matching subset of the routing graph. Here, the comparison and matching is performed as described above with respect to FIG. 8. Factors that can be utilized in comparing the trajectory graph to subsets of the routing graph include, e.g., length of edges between two nodes; number, distance and orientation of neighboring nodes; orientation of edges; etc.

At stage 1110, a position of the mobile device 12 is estimated, e.g., by a position estimation module 308, based at least in part on a matching subset of the routing graph as identified at stage 1108. The estimated position may be a relative position with respect to the area or an absolute position, as described above.

Figure 12:
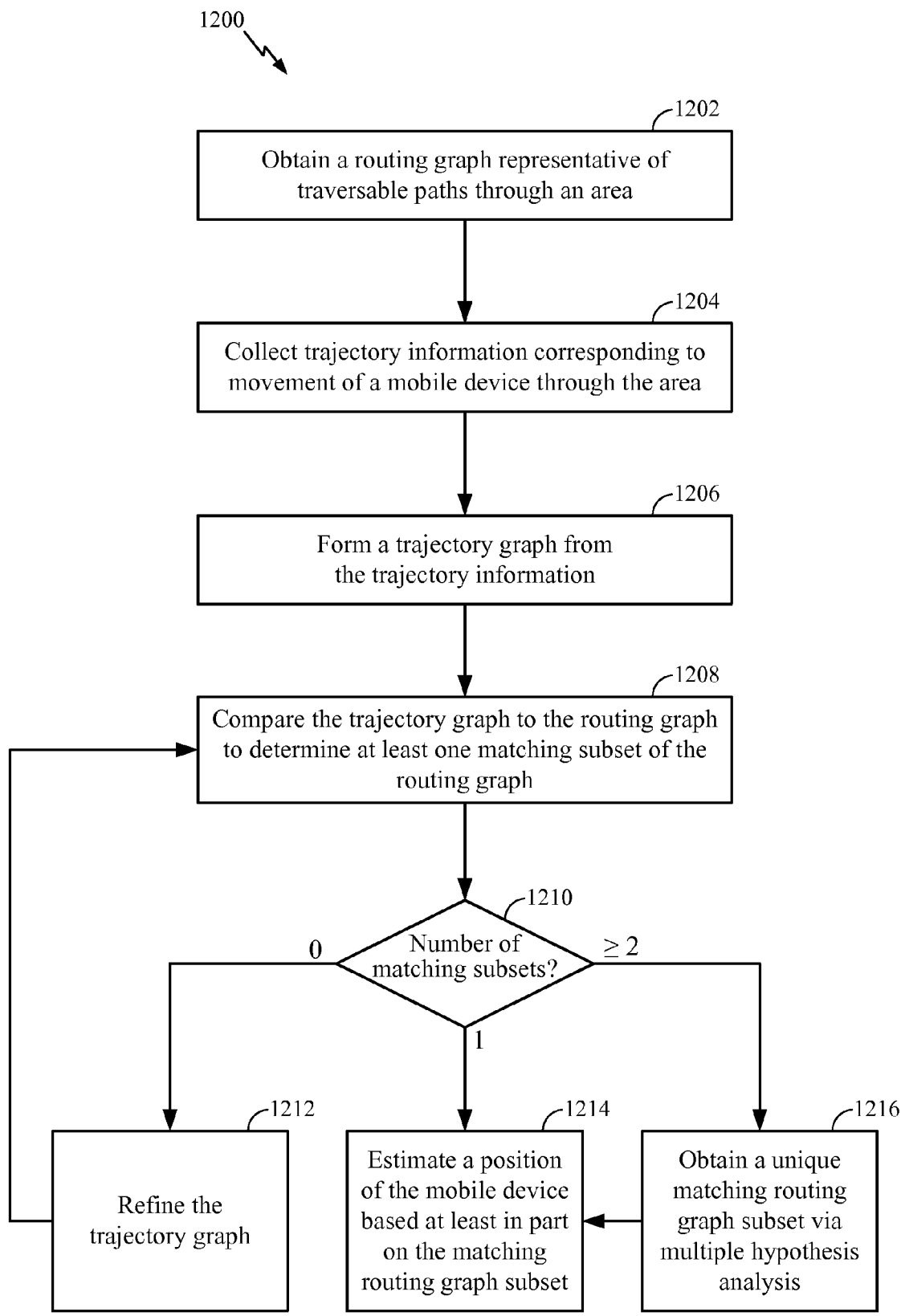

Referring next to FIG. 12, with further reference to FIGS. 1-10, another process 1200 of estimating position of a mobile device 12 using trajectory information includes the stages shown. The process 1200 is, however, an example only and not limiting. The process 1200 can be altered, e.g., by having stages added, removed, rearranged, combined, and/or performed concurrently. Still other alterations to the process 1200 as shown and described are possible.

At stage 1202, a routing graph representative of traversable paths through an area is obtained. At stage 1204, trajectory information is collected that corresponds to movement of a mobile device 12 through the area. At stage 1206, a trajectory graph is formed from the trajectory information collected at stage 1204. Stages 1202, 1204, 1206 of process 1200 are performed in a similar manner to that described above with respect to stages 1102, 1104, 1106 of process 1100.

At stage 1208, the trajectory graph formed at stage 1206 is compared, e.g., by the graph matching module 306, with the routing graph obtained at stage 1202 in order to determine at least one matching subset of the routing graph. The process 1200 then branches at stage 1210 based on the number of subsets of the routing graph that exhibit at least a threshold match with the trajectory graph as a result of the comparison and matching performed at stage 1208.

If no matching subsets of the routing graph are identified at stage 1208, the process 1200 branches from stage 1210 to stage 1212. At stage 1212, the trajectory graph is refined, e.g., by identifying one or more nodes of the trajectory graph as false nodes, removing the false nodes from the trajectory graph to obtain an updated trajectory graph, as described above. Upon refining the trajectory graph, the process 1200 returns to stage 1208 to repeat the attempted matching for the routing graph and the updated (refined) trajectory graph.

If a unique matching subset of the routing graph is identified at stage 1208, the process 1200 branches from stage 1210 to stage 1214. At stage 1214, a position of the mobile device 12 is estimated based at least in part on the unique matching subset of the routing graph, e.g., using the techniques described above to determine a relative or absolute location of the mobile device 12 in a similar manner to stage 1110 of process 1100.

If multiple matching subsets of the routing graph are identified at stage 1208, the process 1200 branches from stage 1210 to stage 1216. At stage 1216, a unique one of the multiple identified routing graph subsets are identified via multiple-hypothesis analysis, as described above with respect to FIGS. 9-10. In general, the multiple-hypothesis analysis proceeds by maintaining multiple matching hypotheses corresponding to respective ones of the matching subsets of the routing graph identified at stage 1208. To resolve these multiple hypotheses into a single, unique match, supplemental trajectory information corresponding to further movement of the mobile device 12 through the area (e.g., based on guide information provided to a user of the device 12, as shown in FIG. 10) is obtained and combined with the original trajectory information, and matching proceeds for the matching subsets of the routing graph and the combined trajectory information. The process of obtaining additional trajectory information and performing matching for the additional trajectory information may repeat until the matching converges on a unique subset of the routing graph. Once a unique match has been obtained via the multiple-hypothesis analysis at stage 1216, the process 1200 concludes at stage 1214 by estimating the position of the mobile device 12 as described above.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for estimating a position of a mobile device, the method comprising:
    obtaining a routing graph corresponding to an area, wherein the routing graph indicates traversable paths through the area;
    collecting trajectory information corresponding to movement of the mobile device through the area;
    forming a trajectory graph from the trajectory information;
    comparing the trajectory graph to at least one subset of the routing graph to determine at least one matching subset of the routing graph, wherein comparing the trajectory graph to the at least one subset of the routing graph comprises determining a number of subsets of the routing graph that exhibit at least a threshold degree of similarity to the trajectory graph, and in response to determining that a plurality of subsets of the routing graph exhibit at least the threshold degree of similarity to the trajectory graph:
        obtaining supplemental trajectory information corresponding to further movement of the mobile device through the area;
        updating the trajectory graph based on the trajectory information and the supplemental trajectory information; and
        comparing the updated trajectory graph to the at least one subset of the routing graph; and
    estimating the position of the mobile device based at least in part on the at least one matching subset of the routing graph.

2. The method of claim 1 wherein forming the trajectory graph comprises:
    identifying turns indicated in the trajectory information of an angle within a threshold range;
    defining the identified turns as nodes in the trajectory graph; and
    defining segments of movement between the identified turns as edges in the trajectory graph.

3. The method of claim 1 wherein the comparing comprises comparing the trajectory graph to the at least one subset of the routing graph based on at least one of length of edges between nodes; number, distance and orientation of neighboring nodes; or orientation of edges.

4. The method of claim 1, further comprising, in response to determining that no subsets of the routing graph exhibit at least the threshold degree of similarity to the trajectory graph:
    refining the trajectory graph to obtain a refined trajectory graph; and
    comparing the refined trajectory graph to the at least one subset of the routing graph.

5. The method of claim 4 wherein refining the trajectory graph comprises:
    identifying one or more nodes of the trajectory graph as false nodes; and
    removing the false nodes from the trajectory graph to obtain the refined trajectory graph.

6. The method of claim 1, further comprising, in response to determining that the plurality of subsets of the routing graph exhibit at least the threshold degree of similarity to the trajectory graph, maintaining a plurality of matching hypotheses corresponding to respective ones of the plurality of subsets of the routing graph.

7. The method of claim 6 further comprising displaying the plurality of matching hypotheses on a display screen of the mobile device.

8. The method of claim 1, further comprising repeating the obtaining supplemental trajectory information, combining the trajectory information and the supplemental trajectory information, building the updated trajectory graph and comparing the updated trajectory graph to the at least one subset of the routing graph until a single subset of the routing graph matches the updated trajectory graph.

9. The method of claim 1, further comprising displaying guided movement information on a display screen of the mobile device to assist a user of the mobile device in performing the further movement of the mobile device associated with the supplemental trajectory information.

10. The method of claim 1 wherein estimating the position of the mobile device comprises estimating the position of the mobile device relative to the area.

11. The method of claim 1 wherein estimating the position of the mobile device comprises estimating the position of the mobile device with respect to Earth.

12. A mobile device that facilitates position estimation, the mobile device comprising:
    a trajectory monitoring module configured to collect trajectory information corresponding to movement of the mobile device through an area;
    a trajectory graphing module communicatively coupled to the trajectory monitoring module and configured to forming a trajectory graph from the trajectory information;
    a graph matching module communicatively coupled to the trajectory graphing module and configured to obtain a routing graph corresponding to the area, wherein the routing graph indicates traversable paths through the area, and to compare the trajectory graph to at least one subset of the routing graph to determine at least one matching subset of the routing graph, wherein the graph matching module configured to compare the trajectory graph to the at least one subset of the routing graph is configured to determine a number of subsets of the routing graph that exhibit at least a threshold degree of similarity to the trajectory graph, and wherein the graph matching module comprises a multiple hypothesis analysis module configured, in response to determining that a plurality of subsets of the routing graph exhibit at least the threshold degree of similarity to the trajectory graph, to direct collection of supplemental trajectory information corresponding to further movement of the mobile device through the area, to direct generation of an updated trajectory graph based on the trajectory information and the supplemental trajectory information, and to compare the updated trajectory graph to the at least one subset of the routing graph; and a position estimation module communicatively coupled to the graph matching module and configured to estimate a position of the mobile device based at least in part on the at least one matching subset of the routing graph.

13. The mobile device of claim 12 wherein the trajectory graphing module is further configured to form the trajectory graph by identifying turns indicated in the trajectory information of an angle within a threshold range, defining the identified turns as nodes in the trajectory graph, and defining segments of movement between the identified turns as edges in the trajectory graph.

14. The mobile device of claim 12 wherein the graph matching module is further configured to compare the trajectory graph to the at least one subset of the routing graph based on at least one of length of edges between nodes; number, distance and orientation of neighboring nodes; or orientation of edges.

15. The mobile device of claim 12 wherein, in response to determining that no subsets of the routing graph match the trajectory graph, the graph matching module is further configured to instruct the trajectory graphing module to produce a refined trajectory graph and to compare the refined trajectory graph to the at least one subset of the routing graph.

16. The mobile device of claim 15 wherein the trajectory graphing module is further configured to produce the refined trajectory graph by identifying one or more nodes of the trajectory graph as false nodes and removing the false nodes from the trajectory graph.

17. The mobile device of claim 12 wherein the multiple hypothesis analysis module is further configured to maintain a plurality of matching hypotheses corresponding to respective ones of the plurality of subsets of the routing graph that are determined by the graph matching module to exhibit the at least the threshold degree of similarity to the trajectory graph.

18. The mobile device of claim 17 wherein the multiple hypothesis analysis module is further configured to display the plurality of matching hypotheses on a display screen of the mobile device.

19. The mobile device of claim 12, wherein the multiple hypothesis analysis module is further configured to operate iteratively until a single subset of the routing graph matches the updated trajectory graph.

20. The mobile device of claim 12, wherein the graph matching module further comprises a trajectory guide communicatively coupled to the multiple hypothesis analysis module and configured to display guided movement information on a display screen of the mobile device to assist a user of the mobile device in performing the further movement of the mobile device associated with the supplemental trajectory information.

21. The mobile device of claim 12 wherein the graph matching module obtains the routing graph from a server computing device.

22. The mobile device of claim 12 further comprising a memory configured to store the routing graph, wherein the graph matching module is further configured to obtain the routing graph from the memory.

23. The mobile device of claim 12 further comprising a satellite positioning system (SPS) receiver communicatively coupled to the position estimation module and configured to receive satellite positioning measurements, wherein the position estimation module is further configured to estimate the position of the mobile device based on the at least one matching subset of the routing graph and the satellite positioning measurements.

24. The mobile device of claim 12 further comprising one or more antennas communicatively coupled to the position estimation module and configured to receive network positioning measurements from an associated wireless communication system, wherein the position estimation module is further configured to estimate the position of the mobile device based on the at least one matching subset of the routing graph and the network positioning measurements.

25. A mobile device that facilitates position estimation, the mobile device comprising:
　means for collecting trajectory information corresponding to movement of the mobile device through an area;
　means for forming a trajectory graph from the trajectory information;
　means for obtaining a routing graph corresponding to the area, wherein the routing graph indicates traversable paths through the area;
　means for comparing the trajectory graph to at least one subset of the routing graph to determine at least one matching subset of the routing graph, wherein the means for comparing the trajectory graph to the at least one subset of the routing graph comprises means for determining a number of subsets of the routing graph that exhibit at least a threshold degree of similarity to the trajectory graph, the mobile device further comprising means for maintaining a plurality of matching hypotheses, corresponding to respective ones of a plurality of subsets of the routing graph, in response to determining that the plurality of subsets of the routing graph exhibit at least a threshold degree of similarity to the trajectory graph, the means for maintaining the plurality of matching hypotheses comprising:
　　means for obtaining supplemental trajectory information corresponding to further movement of the mobile device through the area;
　　means for building an updated trajectory graph based on the trajectory information and the supplemental trajectory information; and
　　means for comparing the updated trajectory graph to the at least one subset of the routing graph; and
　means for estimating a position of the mobile device based at least in part on the at least one matching subset of the routing graph.

26. The mobile device of claim 25 wherein the means for forming the trajectory graph comprises:
　means for identifying turns indicated in the trajectory information of an angle within a threshold range;
　means for defining the identified turns as nodes in the trajectory graph; and
　means for defining segments of movement between the identified turns as edges in the trajectory graph.

27. The mobile device of claim 25 wherein the means for comparing comprises means for comparing the trajectory graph to the at least one subset of the routing graph based on at least one of length of edges between nodes; number, distance and orientation of neighboring nodes; or orientation of edges.

28. The mobile device of claim 25 further comprising:
　means for refining the trajectory graph in response to determining that no subsets of the routing graph match the trajectory graph; and means for comparing the refined trajectory graph to the at least one subset of the routing graph.

29. The mobile device of claim 28 wherein the means for refining the trajectory graph comprises:
    means for identifying one or more nodes of the trajectory graph as false nodes; and
    means for removing the false nodes from the trajectory graph, thereby obtaining the refined trajectory graph.

30. The mobile device of claim 25, further comprising means for displaying the plurality of matching hypotheses at the mobile device.

31. The mobile device of claim 25, wherein the means for maintaining the plurality of matching hypotheses operates iteratively until a single subset of the routing graph matches the updated trajectory graph.

32. A non-transitory processor-readable storage medium comprising processor-executable instructions configured to cause a processor to:
    collect trajectory information corresponding to movement of a mobile device through an area;
    generate a trajectory graph from the trajectory information;
    obtain a routing graph corresponding to the area, wherein the routing graph indicates traversable paths through the area;
    compare the trajectory graph to at least one subset of the routing graph to determine at least one matching subset of the routing graph, the instructions configured to cause the processor to compare the trajectory graph to the at least one subset of the routing graph are configured to determine a number of subsets of the routing graph that exhibit at least a threshold degree of similarity to the trajectory graph, and, in response to determining that a plurality of subsets of the routing graph exhibit at least the threshold degree of similarity to the trajectory graph, to:
        obtain supplemental trajectory information corresponding to further movement of the mobile device through the area;
        build an updated trajectory graph based on the trajectory information and the supplemental trajectory information; and
        compare the updated trajectory graph to the at least one subset of the routing graph; and
    estimate a position of the mobile device based at least in part on the at least one matching subset of the routing graph.

33. The processor-readable storage medium of claim 32 wherein the instructions configured to cause the processor to generate the trajectory graph are further configured to cause the processor to:
    identify turns indicated in the trajectory information of an angle within a threshold range;
    define the identified turns as nodes in the trajectory graph; and
    define segments of movement between the identified turns as edges in the trajectory graph.

34. The processor-readable storage medium of claim 32 wherein the instructions configured to cause the processor to compare are further configured to cause the processor to compare the trajectory graph to the at least one subset of the routing graph based on at least one of length of edges between nodes; number, distance and orientation of neighboring nodes; or orientation of edges.

35. The processor-readable storage medium of claim 32 further comprising instructions configured to cause the processor to:
    refine the trajectory graph in response to determining that no subsets of the routing graph match the trajectory graph; and
    compare the refined trajectory graph to the at least one subset of the routing graph.

36. The processor-readable storage medium of claim 35 wherein the instructions configured to cause the processor to refine the trajectory graph are further configured to cause the processor to identify one or more nodes of the trajectory graph as false nodes and to remove the false nodes from the trajectory graph to obtain the refined trajectory graph.

37. The processor-readable storage medium of claim 32 further comprising instructions configured to cause the processor to maintain a plurality of matching hypotheses corresponding to respective ones of the plurality of subsets of the routing graph in response to determining that the plurality of subsets of the routing graph match the trajectory graph.

38. The processor-readable storage medium of claim 37 wherein the instructions configured to cause the processor to maintain the plurality of matching hypotheses are further configured to be executed iteratively by the processor until a single subset of the routing graph matches the updated trajectory graph.

39. A mobile device, comprising:
    a memory configured to store data relating to a routing graph corresponding to an area, wherein the routing graph indicates traversable paths through the area; and
    a processor communicatively coupled to the memory and configured to collect trajectory information corresponding to movement of the mobile device through the area, to form a trajectory graph from the trajectory information, to compare the trajectory graph to at least one subset of the routing graph to determine at least one matching subset of the routing graph, and to estimate a position of the mobile device based at least in part on the at least one matching subset of the routing graph;
    wherein the processor configured to compare the trajectory graph to the at least one subset of the routing graph is configured to determine a number of subsets of the routing graph that exhibit at least a threshold degree of similarity to the trajectory graph, and, in response to determining that a plurality of subsets of the routing graph exhibit at least the threshold degree of similarity to the trajectory graph, to obtain supplemental trajectory information corresponding to further movement of the mobile device through the area, to build an updated trajectory graph based on the trajectory information and the supplemental trajectory information, and to compare the updated trajectory graph to the at least one subset of the routing graph.

40. The mobile device of claim 39, wherein the processor is configured to refine the trajectory graph to obtain a refined trajectory graph and to compare the refined trajectory graph to the at least one subset of the routing graph in response to determining that no subsets of the routing graph exhibit at least the threshold degree of similarity to the trajectory graph.

41. The mobile device of claim 39, wherein the processor is configured to maintain a plurality of matching hypotheses corresponding to respective ones of the plurality of subsets of the routing graph in response to determining that the plurality of subsets of the routing graph exhibit at least the threshold degree of similarity to the trajectory graph.

42. The mobile device of claim 41, further comprising a display screen communicatively coupled to the processor, wherein the processor is further configured to display guided movement information on the display screen to assist a user of the mobile device in performing the further movement of the mobile device associated with the supplemental trajectory information.

* * * * *